United States Patent
Xu et al.

(10) Patent No.: US 9,332,324 B2
(45) Date of Patent: May 3, 2016

(54) METHOD AND APPARATUS FOR EFFICIENT AND TRANSPARENT NETWORK MANAGEMENT AND APPLICATION COORDINATION FOR SOFTWARE DEFINED OPTICAL SWITCHED DATA CENTER NETWORKS

(71) Applicant: Sodero Networks, Inc., Cranbury, NJ (US)

(72) Inventors: Lei Xu, Princeton Junction, NJ (US); Yueping Zhang, Princeton, NJ (US)

(73) Assignee: Guohua Liu, Chino Hills, CA (US)

( * ) Notice: Subject to any disclaimer, the term of this patent is extended or adjusted under 35 U.S.C. 154(b) by 0 days.

(21) Appl. No.: 14/202,832

(22) Filed: Mar. 10, 2014

(65) Prior Publication Data

US 2014/0270761 A1 Sep. 18, 2014

Related U.S. Application Data

(60) Provisional application No. 61/777,675, filed on Mar. 12, 2013.

(51) Int. Cl.
| | |
|---|---|
| *H04Q 11/00* | (2006.01) |
| *H04J 14/00* | (2006.01) |
| *H04J 14/02* | (2006.01) |
| *H04L 12/931* | (2013.01) |
| *H04L 12/24* | (2006.01) |
| *H04L 12/729* | (2013.01) |
| *H04L 12/721* | (2013.01) |

(52) U.S. Cl.
CPC ........ *H04Q 11/0005* (2013.01); *H04J 14/0204* (2013.01); *H04J 14/0257* (2013.01); *H04J 14/0267* (2013.01); *H04L 41/0823* (2013.01); *H04L 45/125* (2013.01); *H04L 45/62* (2013.01); *H04L 49/356* (2013.01)

(58) Field of Classification Search
CPC ............. H04Q 11/0005; H04J 14/0204; H04J 14/0257
USPC ................................................ 398/42, 43, 45
See application file for complete search history.

(56) References Cited

U.S. PATENT DOCUMENTS

| | | |
|---|---|---|
| 7,340,169 B2 | 3/2008 | Ovadia et al. |
| 7,872,990 B2 | 1/2011 | Guo et al. |

(Continued)

OTHER PUBLICATIONS

Guohui ["Programming Your Network at Run-time for Big data Applications" Hot Topics in Software Defined networks].*

(Continued)

*Primary Examiner* — Oommen Jacob
(74) *Attorney, Agent, or Firm* — Panitch Schwarze Belisario & Nadel LLP

(57) ABSTRACT

Application actions are optimized by receiving actions from one or more distributed applications, translating the received actions into one or more network operation primitives, processing the network operation primitives to determine an optimized set of network operation primitives, determining an optimal execution sequence for the optimized set of network operation primitives, and executing the optimized set of network operation primitives based on the optimal execution sequence.

1 Claim, 13 Drawing Sheets

(56) References Cited

U.S. PATENT DOCUMENTS

| | | | |
|---|---|---|---|
| 8,943,509 B2 * | 1/2015 | Bansal et al. | 718/103 |
| 9,009,214 B2 * | 4/2015 | Arimilli et al. | 709/202 |
| 2005/0044195 A1 | 2/2005 | Westfall | |
| 2008/0089693 A1 | 4/2008 | El-Ahmadi et al. | |
| 2008/0181605 A1 | 7/2008 | Palacharla et al. | |
| 2008/0269922 A1 * | 10/2008 | Tesar | 700/49 |
| 2010/0239266 A1 | 9/2010 | Kash et al. | |
| 2010/0260500 A1 | 10/2010 | Ji et al. | |
| 2012/0008944 A1 * | 1/2012 | Singla et al. | 398/45 |
| 2012/0099863 A1 | 4/2012 | Xu et al. | |
| 2012/0114332 A1 | 5/2012 | Zhang et al. | |
| 2013/0022352 A1 | 1/2013 | Yamashita | |
| 2013/0108265 A1 | 5/2013 | Zami et al. | |
| 2014/0093211 A1 | 4/2014 | McColloch et al. | |
| 2014/0119728 A1 | 5/2014 | Zhang et al. | |
| 2014/0270761 A1 * | 9/2014 | Xu et al. | 398/45 |

OTHER PUBLICATIONS

International Search Report and Written Opinion issued Jan. 20, 2014 in International Application No. PCT/US2013/065913, 11 pages.

Christoforos Kachrist et al., "A Survey on Optical Interconnects for Data Centers", IEEE Communications Surveys, IEEE, New York, NY, US, vol. 14, No. 4 dated Oct. 1, 2012, 16 pages.

Lei Xu et al., "Optically interconnected data center networks", Optical Fiber Communication Conference and Exposition (OFC/NFOEC), 2012 and The National Fiber Optic Engineers Conference IEEE, dated Mar. 4, 2012, 3 pages.

Guohui Wang et al., "Programming your network at run-time for big data applications", Hot Topics in Software Defined networks, ACM, 2 Penn Plaza, Suite 701, New York, NY 10121-0701, dated Aug. 13, 2012, 6 pages.

* cited by examiner

| Field | ID1 | ID2 | t | type | parameter | metric |
|---|---|---|---|---|---|---|
| Value | IP, MAC, etc. | IP, MAC, etc. | Timestamp | SET or GET | BANDWIDTH, LATENCY, PATHLENGTH, CONNECTIVITY, ISOLATION, etc. | Mbps, ms, 0/1 |
| Ex1 | 10.1.10.1 | 10.1.10.2 | - | GET | CONNECTIVITY | - |
| Ex2 | 01:23:45:67:89:AB | 00:14:22:01:23:45 | 100ms | SET | BANDWIDTH | 500 Mbps |
| Ex3 | 10.1.10.1 | 00:14:22:01:23:45 | - | SET | ISOLATION | 0 |

METHOD AND APPARATUS FOR EFFICIENT AND TRANSPARENT NETWORK MANAGEMENT AND APPLICATION COORDINATION FOR SOFTWARE DEFINED OPTICAL SWITCHED DATA CENTER NETWORKS

CROSS-REFERENCE TO RELATED APPLICATIONS

This application claims priority to U.S. Provisional Patent Application No. 61/777,675 filed Mar. 12, 2013, which is incorporated herein by reference.

This patent application is related to U.S. Provisional Patent Application No. 61/719,026 filed Oct. 26, 2012, now U.S. application Ser. No. 14/057,133 filed Oct. 18, 2013, published as U.S. Patent Application Publication No. 2014/0119728. Substantive portions of U.S. Provisional Patent Application No. 61/719,026 are attached hereto in an Appendix to the present application. U.S. Provisional Patent Application No. 61/719,026 is incorporated herein by reference.

BACKGROUND OF THE INVENTION

The present invention relates generally to network management systems, and, more particularly, to self-optimizing systems and methods for managing and coordinating a plurality of applications deployed on an optical-switched data center network.

In the past several years, designing the next-generation data center network switching fabric and server interconnect has received much attention from both academia and industry. One approach seeks to design a completely flat network architecture, in which all-to-all non-blocking communication is achieved by deploying highly redundant switches and cables throughout the network. However, such designs are limited by high deployment cost and cabling complexity. In contrast, a second approach proposes constructing an over-subscribed network with on-demand high-throughput paths to resolve network congestion and hotspots. Examples of this approach are the, c-Through and Helios design hybrid electrical and optical network architectures. In these designs, the electrical portion is responsible for maintaining connectivity between all servers and delivering traffic for low-bandwidth flows and the optical portion provides on-demand high-bandwidth links for server pairs with heavy network traffic. Compared to these architectures, the newly proposed systems, such as the system presented in the referenced U.S. Provisional Patent Application No. 61/719,026, pursue an all-optical design and employ optical switching and optical wavelength division multiplexing technologies. This on-demand bandwidth flexibility is achieved using reconfigurable optical switching devices, which are further controlled by a central network manager. This resulting network architecture is called a software defined optical switched network platform. However, managing such an optical switched data center network involves interacting with the low-level optical devices, monitoring network traffic statistics, and optimizing network performance, all of which are daunting tasks for most application developers and network operators.

Accordingly, it is desirable to solve the management challenges and complexities of software defined optical switched data center networks by providing a transparent and self-optimizing network management platform for application developers and network operators. It is further preferable to provide an intermediate management platform that abstracts functionalities of lower-layer physical optical network equipment, communicates with the higher-layer applications via application programming interfaces (APIs), and automatically coordinates, schedules and optimizes the actions of multiple applications.

BRIEF SUMMARY OF THE INVENTION

In one embodiment, application actions are optimized by receiving actions from one or more distributed applications, translating the received actions into one or more network operation primitives, processing the network operation primitives to determine an optimized set of network operation primitives, determining an optimal execution sequence for the optimized set of network operation primitives, and executing the optimized set of network operation primitives based on the optimal execution sequence.

In another embodiment, a method of optimizing application actions performed in an optical switching fabric is described. A processor system receives actions from one or more distributed applications. The actions are associated with an optical switching fabric. The processor system translates the received actions into one or more network operation primitives. The processor system processes the network operation primitives to determine an optimized set of network operation primitives to be actuated on the optical switching fabric and determines an optimal execution sequence for the optimized set of network operation primitives. The processor system executes the optimized set of network operation primitives based on the optimal execution sequence on the optical switching fabric.

In another embodiment, a system for optimizing distributed application actions in an optical switching fabric is described. The optical switching fabric includes a plurality of interconnected optical switching units. A network manager is operably coupled to the optical switching fabric. The network manager is configured to reconfigure the interconnected optical switching units. A managing platform is configured to receive actions from one or more distributed applications. The actions are associated with the optical switching fabric. The received actions are translated into one or more network operation primitives. The network operation primitives are processed to determine an optimized set of network operation primitives to be actuated on the optical switching fabric. An optimal execution sequence is determined for the optimized set of network operation primitives. The optimized set of network operation primitives is executed based on the optimal execution sequence on the optical switching fabric.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1:
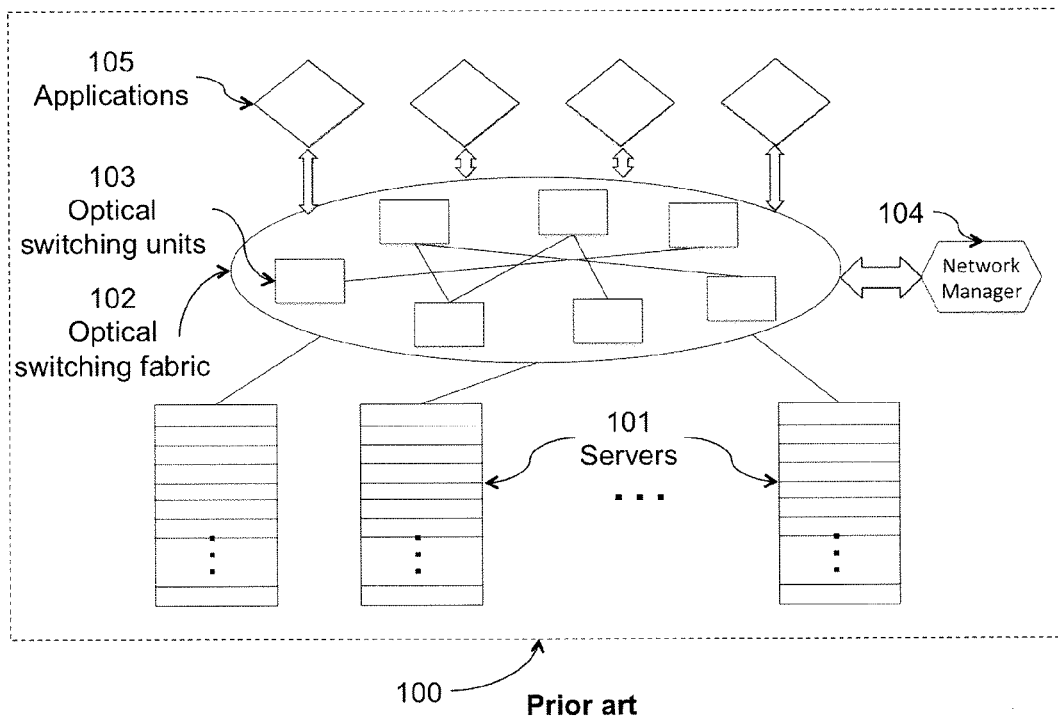
FIG. 1 is a system diagram of a software-defined optical data center network according to preferred embodiments of the present invention.

The present invention will now be described in detail with reference to the drawings, which are provided as illustrative examples of the invention as to enable those skilled in the art to practice the invention. The figures and examples below are not meant to limit the scope of the present invention to a single embodiment, but other embodiments are possible by way of interchange of some or all of the described or illustrated elements. Moreover, where some of the elements of the present invention can be partially or fully implemented using known components, only portions of such known components that are necessary for an understanding of the present invention will be described, and a detailed description of other portions of such known components will be omitted so as not to obscure the invention. Embodiments described as being implemented in software should not be limited thereto, but can include embodiments implemented in hardware, or a combination of hardware and software, and vice-versa, as will be apparent to those skilled in the art, unless otherwise specified therein.

In the present specification, an embodiment showing a singular component should not be considered limiting; rather, the invention is intended to encompass other embodiments, including a plurality of the same embodiments, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Preferred embodiments of the present invention relate to network management systems, and more particularly to self-optimizing systems and methods for managing and coordinating a plurality of applications deployed on an optical switched data center network. The network management platform abstracts the functionalities of the lower-layer optical switched network into a set of operation primitives, and defines a set of intuitive application programming interfaces (APIs) that translate the actions of the higher-layer applications into the lower-layer network operation primitives. Additional aspects also allow the described network management platform to manage the actions of higher-layer applications such that network performance is optimized and conflicts between application actions are resolved. In accordance with these and other aspects, a method of managing the actions of higher-layer applications includes translating application actions into network operation primitives, resolving conflicts between operation primitives and violations of external (e.g., quality of service or QoS) constraints, and mapping these operation primitives into device-implementable commands.

Certain terminology is used in the following description for convenience only and is not limiting. The words "lower," "bottom," "top" and "upper" designate directions in the drawings to which reference is made. The terminology includes the above-listed words, derivatives thereof, and words of similar import. Additionally, the words "a" and "an", as used in the claims and in the corresponding portions of the specification, mean "at least one."

Referring to the drawings in detail, wherein like reference numerals indicate like elements throughout, FIG. 1 is a system diagram of an exemplary (prior art) architecture of a software-defined optical data center network 100 defined by optical switched server cluster interconnects in data centers (or other facilities). In the optical data center network 100, a plurality of servers 101 are interconnected with an optical switching fabric 102. The optical switching fabric 102 includes a plurality of optical switching units 103, such that every server 101 in the data center 100 can reach every other server 101 through the optical switching fabric 102. All of the optical switching units 103 are controlled by a network manager 104, and can be reconfigured at run time. Preferably, the network manager 104 is centralized, but in other embodiments, the network manager 104 may be distributed. A plurality of distributed applications 105 are deployed on the servers 101. Preferably, each application 105 is configured to initiate network-related actions, such as demanding bandwidth of a particular network path, imposing latency requirement(s) between a certain pair of origin(s) and destination(s), and requesting physical isolation from certain other applications 105. All these actions involve low-level interactions between the physical network equipment, such as the optical switching units 103, and detailed knowledge of network operation. These tasks are typically difficult to perform for the application owner and/or the network service provider.

Figure 2:
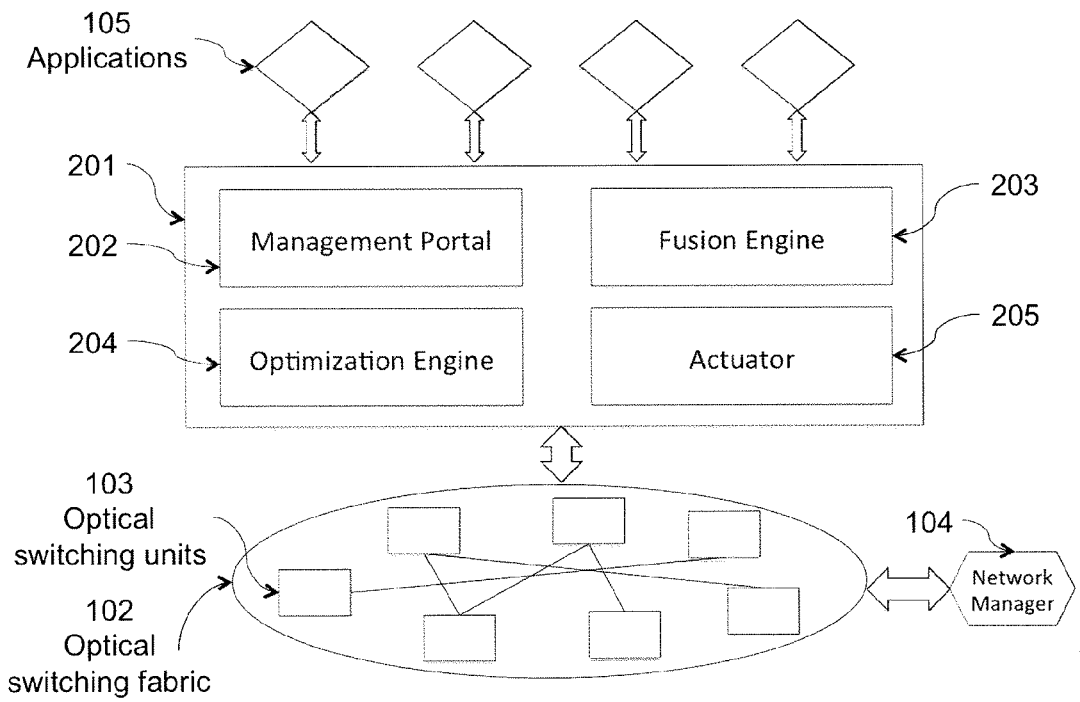
FIG. 2 is system diagram of an intermediate network management platform for managing the optical data center network of FIG. 1.

Referring to FIG. 2, there is shown a management platform 201 for managing the software-defined optical data center network 100, in which a software network controller monitors and reconfigures the set of optical switching units 103 such that certain functionality is achieved (such as performance optimization, traffic engineering, and network virtualization). The management platform 201 is preferably deployed to reside between the applications 105 and the optical switching fabric 102. The management platform 201 is implemented by one or more physical or virtual servers. Based on the practical application scenarios, one can choose to implement the management platform in a centralized server with failover mechanisms, or distribute the functionality onto different servers using decentralized management mechanisms, such as a distributed hashing table (DHT). Various such failover mechanisms and decentralized management mechanisms are known to those skilled in the art. The management platform 201 preferably includes a management portal 202, a fusion engine 203, an optimization engine 204, and an actuator 205. The management portal 202 is an interface between the applications 105 and the network management system 201.

Figures 3, 4:
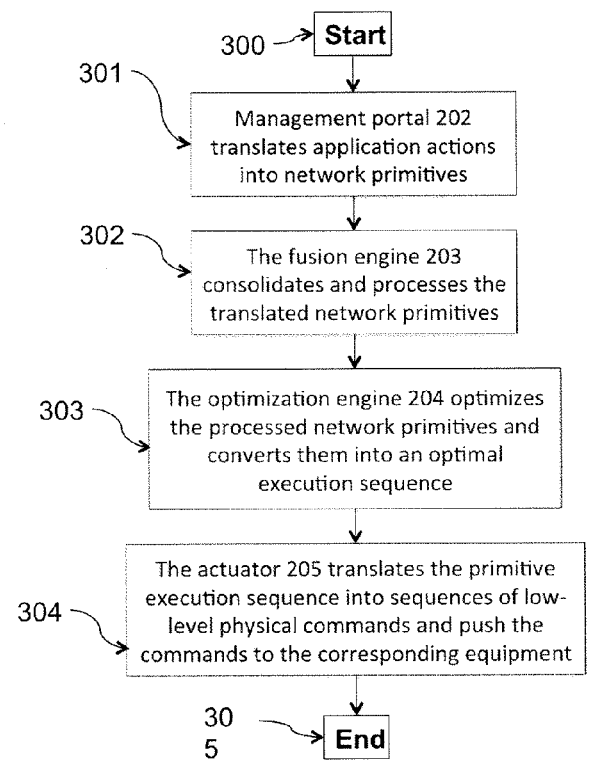
FIG. 3 is a flowchart of steps of an operation process of the management platform 201 of FIG. 2.
FIG. 4 is an exemplary representation of a network operation primitive.

Referring to FIG. 3, a flowchart showing the operating process of the management system 201 is shown. The process starts at step 300 and in step 301, the management portal 202 translates application 105 actions, such as querying network status and changing network equipment configurations, into network operation primitives. Network operation primitives, as defined below, are a set of high-level abstractions of basic functionalities of the underlying optical switching fabric 102. In step 302, the translated network operation primitives of the multiple applications 105 actions are passed from the management portal 202 to the fusion engine 203. The fusion engine 203 processes the received operation primitives to, for example, remove duplicate primitives, consolidate related primitives into a single primitive, resolve any conflicts between primitives, and the like. In step 303, the processed operation primitives are output by the fusion engine 203 to the optimization engine 204. The optimization engine 204 processes the received primitives output by the fusion engine 203 to determine a primitive execution plan such that network performance is optimized and all the primitives' objectives and deadlines are met. In step 304, the actuator 205 translates the optimized primitive execution plan into a sequence of implementable network operations (e.g., device commands and configuration files), and sends them to the underlying optical switching fabric 102.

The four components of the management platform 201 will now be described in further detail.

Management Portal

The management portal 202 is implemented by one or more servers, and is configured to abstract the functionalities of the optical switching fabric 102 using a set of operation primitives. Referring to FIG. 4, an exemplary definition of a network operation primitive is shown as a set of arguments. In the preferred embodiment, the set of arguments is a six-tuple defined as <ID1, ID2, t, Type, Parameter, Metric>. However, those skilled in the art will understand that other forms, arguments, and definitions of the network operation primitives can be defined without departing from the scope of this invention to achieve the described functionalities. Under the preferred definition of the network operation primitive, the arguments ID1 and ID2 are globally unique identifiers and can refer to both the end hosts (i.e., physical servers or virtual machines) and network nodes (i.e., switches and routers). The argument t designates the deadline for this action. The Type argument denotes whether the action is GET or SET; The Parameter argument specifies whether this action is related to BANDWIDTH, LATENCY, PATHLENGTH, CONNECTIVITY, ISOLATION, or the like. The Metric argument carries the value of the Parameter argument.

Applying the above network operation primitive definitions, as shown by entry "Ex1" of FIG. 4, the action "Are Server 10.1.10.1 and Server 10.1.10.2 connected?" can be denoted by:

<10.1.10.1, 10.1.10.2, _, GET, CONNECTIVITY, _>.

Similarly, as shown by entry "Ex2" in FIG. 4, the action "Allocate 500 Mbps between Server 01:23:45:67:89:AB and Server 00:14:22:01:23:45 in 100 ms" can be denoted by:

<01:23:45:67:89:AB, 00:14:22:01:23:45, 100 ms, SET, BANDWIDTH, 500 Mbps>.

Furthermore, as shown by entry "Ex3" in FIG. 4, the action "the network traffic between Server 10.1.10.1 and Server 10.1.10.2 cannot share a link with any other applications" can be denoted by:

<10.1.10.1, 10.1.10.2, _, SET, ISOLATION, 0>.

More complicated actions can be decomposed into multiple atomic actions using the network operation primitives.

The network operation primitives also serve as the interface between the applications 105 and the management platform 201. In this way, without knowing detailed network configurations and complicated device control commands, the applications 105 can query the network statistics (e.g., bandwidth, latency, path length, connectivity, etc.), specify their own desired values, and compose more complicated actions. However, actions of different applications 105 are initiated from the individual applications' 105 own perspectives and therefore may contain redundancy, inconsistency, and even conflicts. The fusion engine 203 is designed to process the native application 105 actions and resolve these issues.

Fusion Engine

Figure 5:
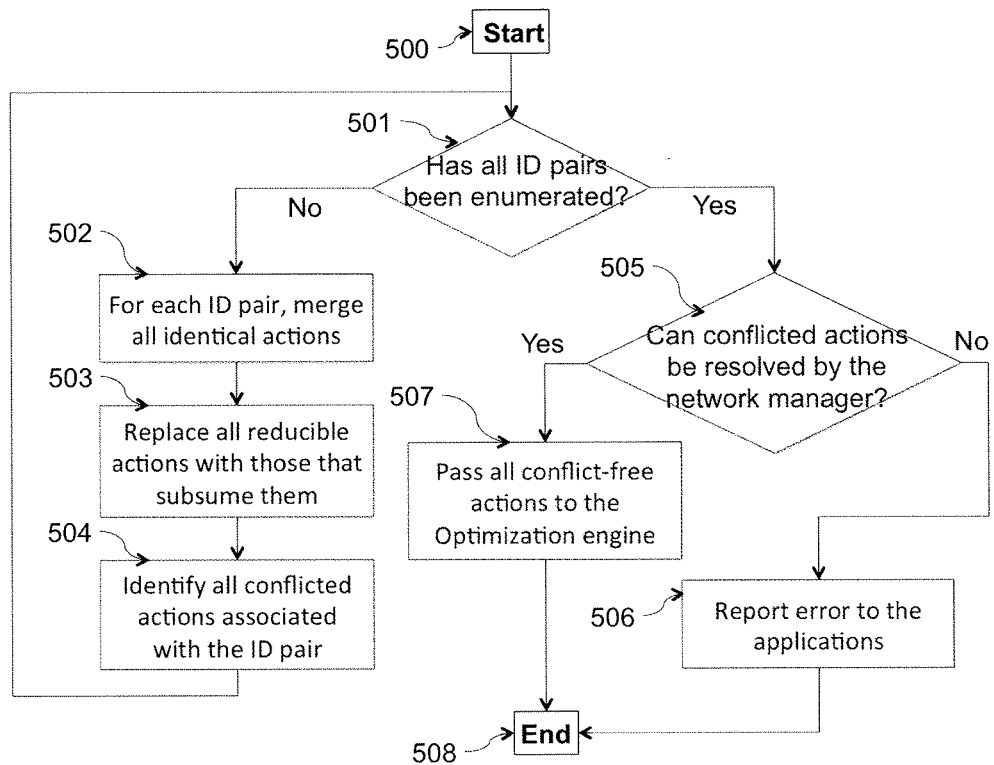
FIG. 5 is a flowchart of steps of an operation process of a fusion engine of the intermediate network management platform of FIG. 2.

The fusion engine 203 is implemented by one or more servers, and is configured to perform a fusion process, as shown by the steps of the flowchart of FIG. 5. The fusion process begins at step 500, and proceeds to step 501 where the fusion engine 203 first enumerates all ID pairs. All identical actions are consolidated by the fusion engine 203 in step 502. At step 503, for each ID pair, the fusion engine 203 examines each action to determine whether it is subsumed by other actions. All such actions are reduced to the actions that subsume them. For instance, if one action queries a network bandwidth of a given link in 100 ms and another action does the same thing, but in 150 ms, then the second action is subsumed, and can be replaced by the first action.

At step 504, for each ID pair, the fusion engine 203 checks whether there is any conflict between actions. As is understood by those skilled in the art, a conflict arises when two or more irreconcilable actions access the same system variables, such as latency of a network route, configuration file, or bandwidth of a link. For instance, a conflict arises if one application sets the latency of a certain network segment to 50 ms and another application sets it to 100 ms. Another example of conflict is the total bandwidth demand of a certain network link from all applications exceeding the link capacity. After identifying all conflicts, the fusion engine 203 in step 505 passes the conflicts to the network manager 104 of the underlying optical switching fabric 102 to determine whether the network can be reconfigured to resolve the identified conflicts. If not, the network manager 104 returns the irresolvable conflicts to the fusion engine 203 in step 506. The fusion engine 203 reports the errors to the applications 105 that initiated these conflicted actions. If the conflict can be resolved by the network manager 104, at step 507, the fusion engine 203 passes all the remaining conflict-free actions to the optimization engine 204 for further processing.

Figure 6:
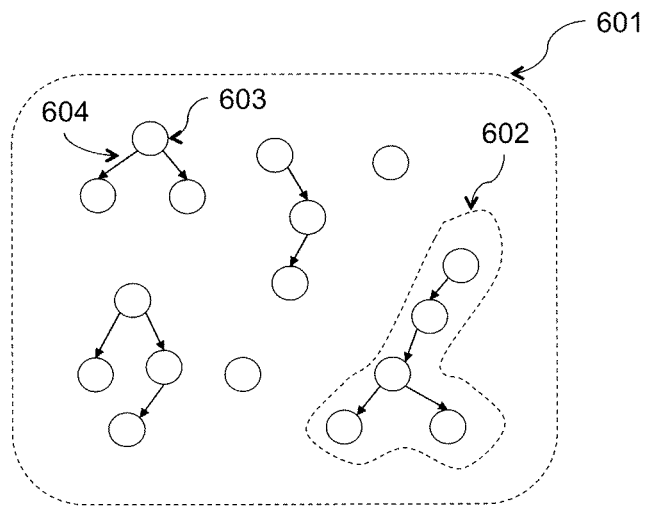
FIG. 6 is an illustration of an operation forest for identifying conflicted and subsumed operations according to preferred embodiments of the present invention.

Referring to FIG. 6, one exemplary approach to identify subsumed or conflicted operations is shown. Under this approach, an operation forest 601 is constructed. The operation forest is composed of one or multiple operation trees, 602, which is further composed of a set of nodes 603 and directed links 604 connecting many pairs of nodes. Within each operation tree, a node 603 represents an operation. A link 604 pointing from node A to node B implies that operation A subsumes operation B.

Figure 7:
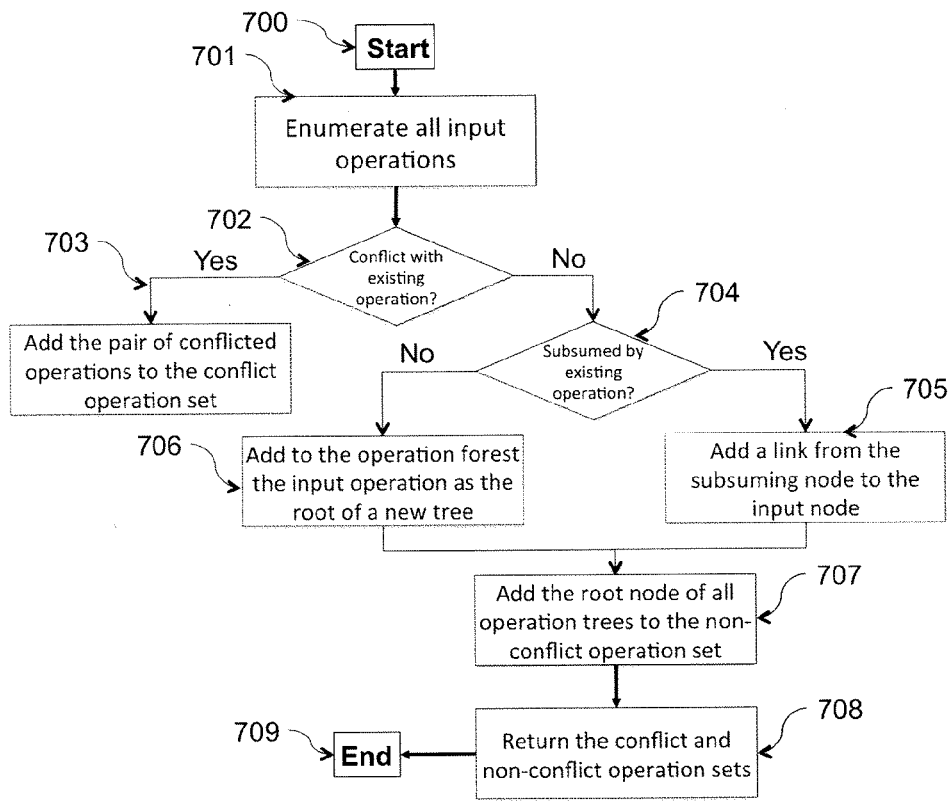
FIG. 7 is a flowchart of steps of an operation process for determining conflicted and subsumed operations in a given operation set of the operation forest of FIG. 6.

An algorithm that identifies subsumed and conflicted operations is illustrated in the flowchart of FIG. 7. The procedure starts at step 700, takes as input a set of operations, and empties the operation forest 601, the conflict operation set and non-conflict operation set. In step 701, the system enumerates all the input actions. For each operation, the procedure in step 702 first checks whether the operation is conflicted with an operation that already exists in the operation forest 601. If yes, in step 703, the pair of conflicted operations is added to the conflict operation set. If not, in step 704, the system checks whether the input operation is subsumed by an operation that is already in the operation forest 601. If yes, in step 705, the system adds a link from the subsuming node (i.e., operation) to the input node (i.e., operation). If not, in step 706, the system adds to the operation forest 601 the input operation as the root of a new operation tree. After all the input operations are enumerated, in step 707, the system adds the root node of all operation trees 602 in the operation forest 601 to the non-conflict operation set. The system returns the conflict operation set and non-conflict operation set in step 708, and ends in step 709.

Others approaches to achieve the above functionality are known to those skilled in the art, and are within the scope of our disclosure.

Optimization Engine

The optimization engine 204 is implemented by one or more servers, and is configured to determine an optimal execution sequence for the conflict-free actions. The optimization engine 204 receives the conflict-free actions from the fusion engine 203, and determines an optimal execution sequence of these actions such that the overhead incurred to the network operation is minimized.

Figure 8:
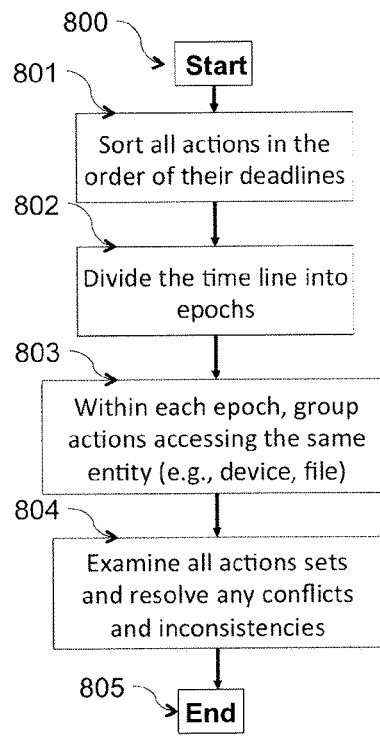
FIG. 8 is a flow chart of an operation process of an optimization engine of the intermediate network management platform of FIG. 2.

Referring to the flowchart of FIG. 8, the optimization process performed by the optimization engine 204 is composed of the following steps. The process begins at step 800, and in step 801, all the actions received from the fusion engine 203 are sorted in the order of their deadlines t. At step 802, time is divided into epochs, each of which contains a number of deadlines. The division can follow a uniform/even division, or a probabilistic distribution. In step 803, within each epoch, actions are grouped into action sets. Actions belonging to the same action set requires access to the same configuration file, device, or other identities. In step 804, all action sets are examined, and any conflicts/inconsistencies are resolved using similar techniques as those used in the fusion engine 203 as illustrated in FIG. 5. After the optimization process is completed, the process ends at step 805, and the action sets are fed into the actuator 205 from the optimization engine 204 for further processing.

Actuator

The actuator 205 implemented by one or more servers is a communication module of the management platform 201, and is configured to send the action sets to the network manager 104 following a predefined communication protocol. Then, based on the received commands, the network manager 104 either responds to queries of network status (i.e., latency, routing, bandwidth, or the like) or issues reconfiguration commands (i.e., redistributing wavelength assignment, changing optical circuits, turning on/off mechanical switches, or the like) to the optical switching units 103. In case of status queries, the actuator 205 propagates the response generated by the network manager 104 up to the querying application. In case of reconfiguration commands, the optical switching units 103 reconfigures based on the received commands. The network manager 104 is responsible for ensuring minimum service disruption during the reconfiguration.

According to the preferred embodiments, the intermediate network management platform 201 for software-defined optical networks resides between the high-level applications 105 and the low-level network manager. From the perspectives of the applications 105, the management platform is a unified interface for managing the underlying optical switching fabric 102. This way, the application developers do not need to understand the detailed hardware configurations and operations, thereby significantly lowering the development barrier. On the other hand, from the perspective of the network manager 104, the management platform 201 is a single application with consolidated and optimized queries and action sequences. Thus, the network manager 104 does not need to coordinates actions issued by different applications, which significantly reduces the complexity and workload of the network manager.

APPENDIX

Specification of U.S. Provisional Application No. 61/719,026

Title: Method and Apparatus for Implementing a Multi-Dimensional Optical Circuit Switching Fabric Part I: BACKGROUND OF THE INVENTION Embodiments of the present invention relate generally to computer network switch design and network management. More particularly, the present invention relates to scalable and self-optimizing optical circuit switching networks, and methods for managing such networks.

Inside traditional data centers, network load has evolved from local traffic (i.e., intra-rack or intra-subnet communications) into global traffic (i.e., all-to-all communications). Global traffic requires high network throughput between any pair of servers. The conventional over-subscribed tree-like architectures of data center networks provide abundant network bandwidth to the local areas of the hierarchical tree, but provide scarce bandwidth to the remote areas. For this reason, such conventional architectures are unsuitable for the characteristics of today's global data center network traffic.

Various next-generation data center network switching fabric and server interconnect architectures have been proposed to address the issue of global traffic. One such proposed architecture is a completely flat network architecture, in which all-to-all non-blocking communication is achieved. That is, all servers can communicate with all the other servers at the line speed, at the same time. Representatives of this design paradigm are the Clos-network based architectures, such as FatTree and VL2. These systems use highly redundant switches and cables to achieve high network throughput. However, these designs have several key limitations. First, the redundant switches and cables significantly increase the cost for building the network architecture. Second, the complicated interconnections lead to high cabling complexity, making such designs infeasible in practice. Third, the achieved all-time all-to-all non-blocking network communication is not necessary in practical settings, where high-throughput communications are required only during certain periods of time and are constrained to a subset of servers, which may change over time.

A second such proposed architecture attempts to address these limitations by constructing an over-subscribed network with on-demand high-throughput paths to resolve network congestion and hotspots. Specifically, c-Through and Helios design hybrid electrical and optical network architectures, where the electrical part is responsible for maintaining connectivity between all servers and delivering traffic for low-bandwidth flows and the optical part provides on-demand high-bandwidth links for server pairs with heavy network traffic. Another proposal called Flyways is very similar to c-Through and Helios, except that it replaces the optical links with wireless connections. These proposals suffer from similar drawbacks.

Compared to these architectures, a newly proposed system, called OSA, pursues an all-optical design and employs optical switching and optical wavelength division multiplexing technologies. However, the optical switching matrix or Microelectromechanical systems (MEMS) component in OSA significantly increases the cost of the proposed architecture and more importantly limits the applicability of OSA to only small or medium sized data centers.

Accordingly, it is desirable to provide a high-dimensional optical circuit switching fabric with wavelength division multiplexing and wavelength switching and routing technologies that is suitable for all sizes of data centers, and that reduces the cost and improves the scalability and reliability of the system. It is further desirable to control the optical circuit switching fabric to support high-performance interconnection of a large number of network nodes or servers.

Part II: SUMMARY OF THE INVENTION

In one embodiment, an optical switching system is described. The system includes a plurality of interconnected wavelength selective switching units. Each of the wavelength selective switching units is associated with one or more server racks. The interconnected wavelength selective switching units are arranged into a fixed structure high-dimensional interconnect architecture comprising a plurality of fixed and structured optical links. The optical links are arranged in a k-ary n-cube, ring, mesh, torus, direct binary n-cube, indirect binary n-cube, Omega network or hypercube architecture.

In another embodiment, a broadcast/select optical switching unit is described. The optical switching unit includes a multiplexer, an optical power splitter, a wavelength selective switch and a demultiplexer. The multiplexer has a plurality of first input ports. The multiplexer is configured to combine a plurality of signals in different wavelengths from the plurality of first input ports into a first signal output on a first optical link. The optical power splitter has a plurality of first output ports. The optical power splitter is configured to receive the first signal from the first optical link and to duplicate the first signal into a plurality of duplicate first signals on the plurality of first output ports. The duplicated first signal is transmitted to one or more second optical switching units. The wavelength selective switch has a plurality of second input ports. The wavelength selective switch is configured to receive one or more duplicated second signals from one or more third optical switching units and to output a third signal on a second optical link. The one or more duplicated second signals are generated by second optical power splitters of the one or more third optical switching units. The demultiplexer has a plurality of second output ports. Each second output port has a distinct wavelength. The demultiplexer is configured to receive the third signal from the second optical link and to separate the third signal into the plurality of second output ports.

An optical switching fabric comprising a plurality of optical switching units. The plurality of optical switching units are arranged into a fixed structure high-dimensional interconnect architecture. Each optical switching unit includes a multiplexer, a wavelength selective switch, an optical power combiner and a demultiplexer. The multiplexer has a plurality of first input ports. The multiplexer is configured to combine a plurality of signals in different wavelengths from the plurality of first input ports into a first signal output on a first optical link. The wavelength selective switch has a plurality of first output ports. The wavelength selective switch is configured to receive the first signal from the first optical link and to divide the first signal into a plurality of second signals. Each second signal has a distinct wavelength. The plurality of second signals are output on the plurality of first output ports. The plurality of second signals are transmitted to one or more second optical switching units. The optical power combiner has a plurality of second input ports. The optical power combiner is configured to receive one or more third signals having distinct wavelengths from one or more third optical switching units and to output a fourth signal on a second optical link. The fourth signal is a combination of the received one or more third signals. The demultiplexer has a plurality of second output ports. Each second output port has a distinct wavelength. The demultiplexer is configured to receive the fourth signal from the second optical link and to separate the fourth signal into the plurality of second output ports based on their distinct wavelengths.

Part III: DETAILED DESCRIPTION OF THE PREFERRED EMBODIMENTS

Certain terminology is used in the following description for convenience only and is not limiting. The words "right", "left", "lower", and "upper" designate directions in the drawings to which reference is made. The terminology includes the above-listed words, derivatives thereof, and words of similar import. Additionally, the words "a" and "an", as used in the claims and in the corresponding portions of the specification, mean "at least one."

The present invention will be described in detail with reference to the drawings. The figures and examples below are not meant to limit the scope of the present invention to a single embodiment, but other embodiments are possible by way of interchange of some or all of the described or illustrated elements. Moreover, where some of the elements of the present invention can be partially or fully implemented using known components, only portions of such known components that are necessary for an understanding of the present invention will be described, and a detailed description of other portions of such known components will be omitted so as not to obscure the invention.

Figure 9:
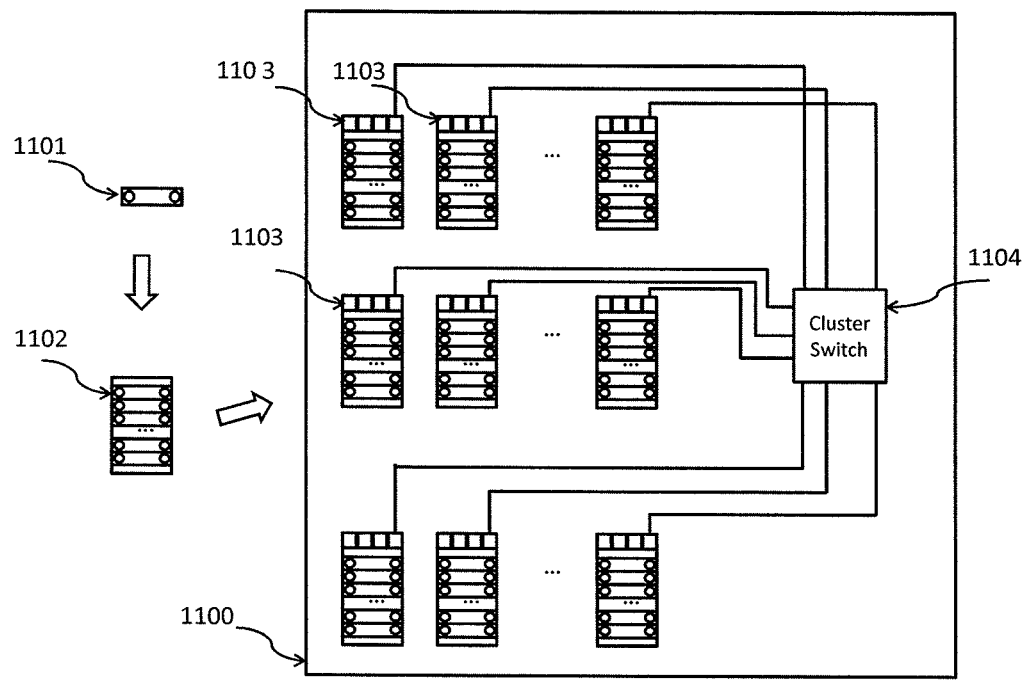
FIG. 9 is a system diagram of a data center network.

Referring to the drawings in detail, wherein like reference numerals indicate like elements throughout, FIG. 9 is a system diagram, which illustrates the typical components of a data center 1100 in accordance with the present invention. The most basic elements of a data center are servers 1101, a plurality of which may be arranged into server racks 1102. Each server rack 1102 is equipped with a top-of-rack switch (ToR) 1103. All of the ToRs 1103 are further interconnected with one or multiple layers of cluster (e.g., aggregation and core) switches 1104 such that every server 1101 in the data center 1100 can communicate with any one of the other servers 1101. The present invention is directed to the network switching fabric interconnecting all ToRs 1103 in the data center 1100.

Figure 12:
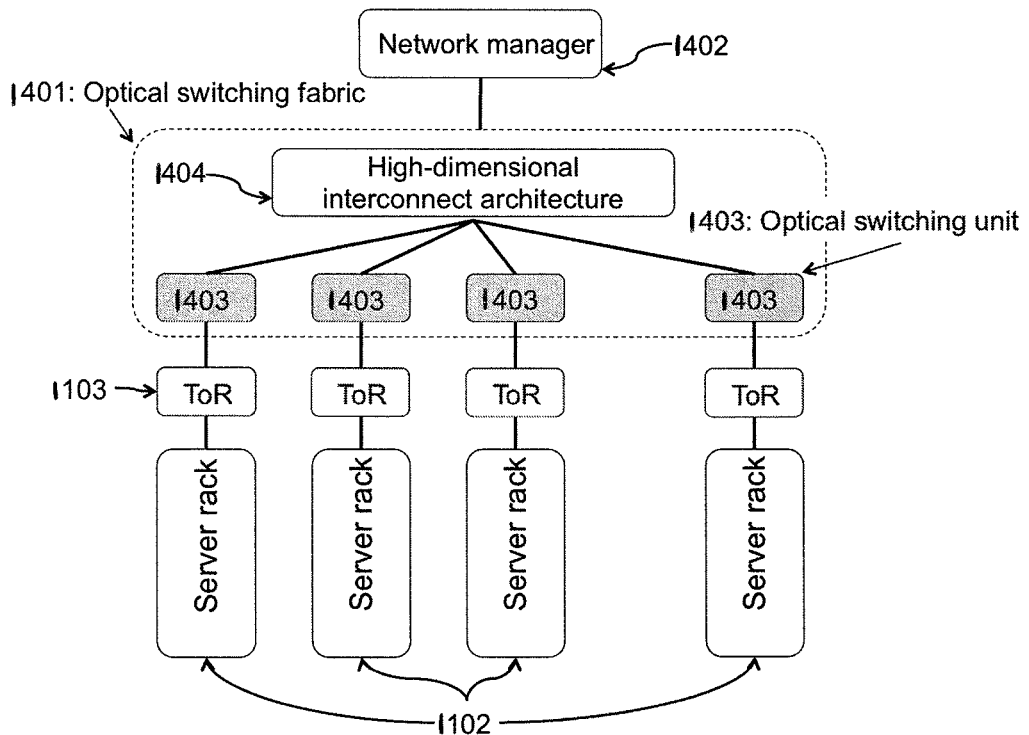
FIG. 12 is a system architecture of an optical switched data center network.

Referring to FIG. 12, a high-dimensional optical switching fabric 1401 for use with the data center 1100 of FIG. 9 is shown. The switching fabric 1401 includes a plurality of wavelength selective switching units 1403 interconnected using a high-dimensional data center architecture 1404. The high-dimensional data center architecture 1404 is achieved by coupling multiple wavelength selective switching units 1403 with fixed and structured fiber links to form a high-dimensional interconnection architecture. Each wavelength selective switching unit 1403 is associated with, and communicatively coupled to, a server rack 1102 through a ToR 1103. The high-dimensional data center architecture 1404 preferably employs a generalized k-ary n-cube architecture, where k is the radix and n is the dimension of the graph. The design of the wavelength selective switching units 1403 and the associated procedures of the network manager 1402 are not limited to k-ary n-cube architectures. Other architectures that are isomorphic to k-ary n-cubes, including rings, meshes, tori, direct or indirect binary n-cubes, Omega network, hypercubes, etc may also be implemented in the high-dimensional data center architecture 404, and are within the scope of this disclosure.

Figure 10:
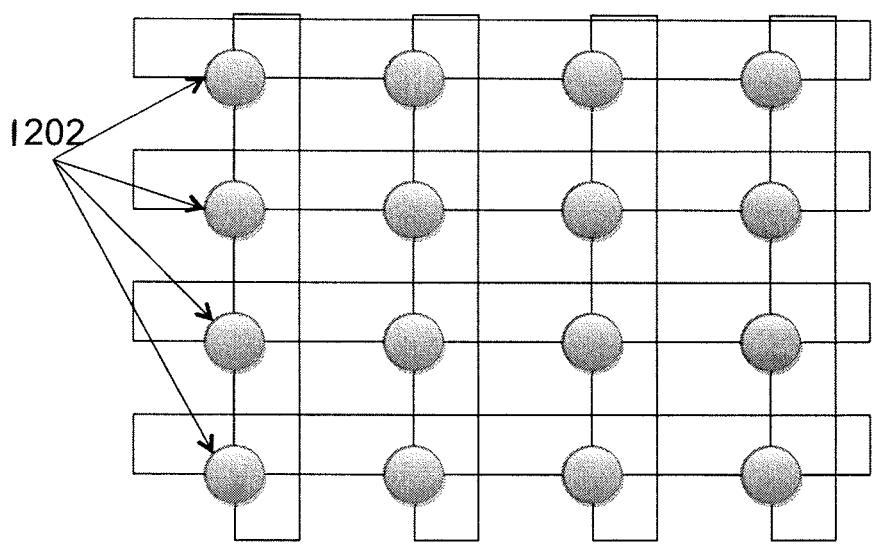
FIG. 10 is a network topology of 4-ary 2-cube architecture implemented in the data center network of FIG. 9.
Figure 11:
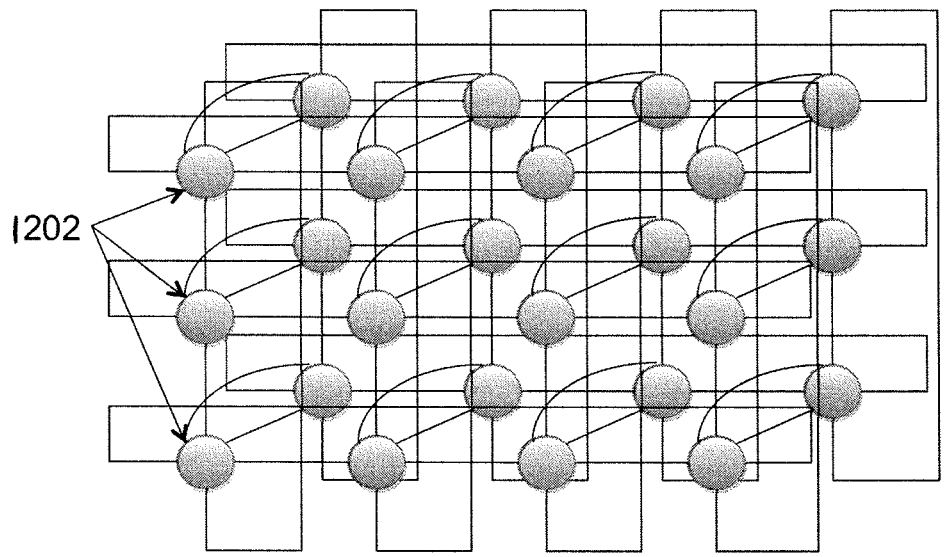
FIG. 11 is a network topology of a (3, 4, 2)-ary 3-cube architecture implemented in the data center network of FIG. 9.

The k-ary n-cube architecture is denoted by Cnk, where n is the dimension and vector k=<k1, k2, ..., kn> denotes the number of elements in each dimension. Referring to FIGS. 10 and 11, examples of a 4-ary 2-cube (i.e., k=<4,4> and n=2) and (3, 4, 2)-ary 3-cube (i.e., k=<3,4,2> and n=3), respectively, are shown. Each node 1202 in FIGS. 10 and 11 represents a server rack 1102 (including a ToR 1103) and its corresponding wavelength selective switching unit 1403. Other examples of architectures are not shown for sake of brevity, but those skilled in the art will understand that such alternative architectures are within the scope of this disclosure.

Two designs of the wavelength selective switching unit 1403 of FIG. 12 are described with reference to FIG. 13 and prior art FIG. 14. The designs of FIGS. 13 and 14 vary based on whether the underlying communication mechanism is broadcast-and-select or point-to-point. Furthermore, a broadcast-and-select based wavelength selective switching unit 1503 may be symmetric or asymmetric, depending on the requirements and constraints of practical settings.

Symmetric Architecture

Figure 13:
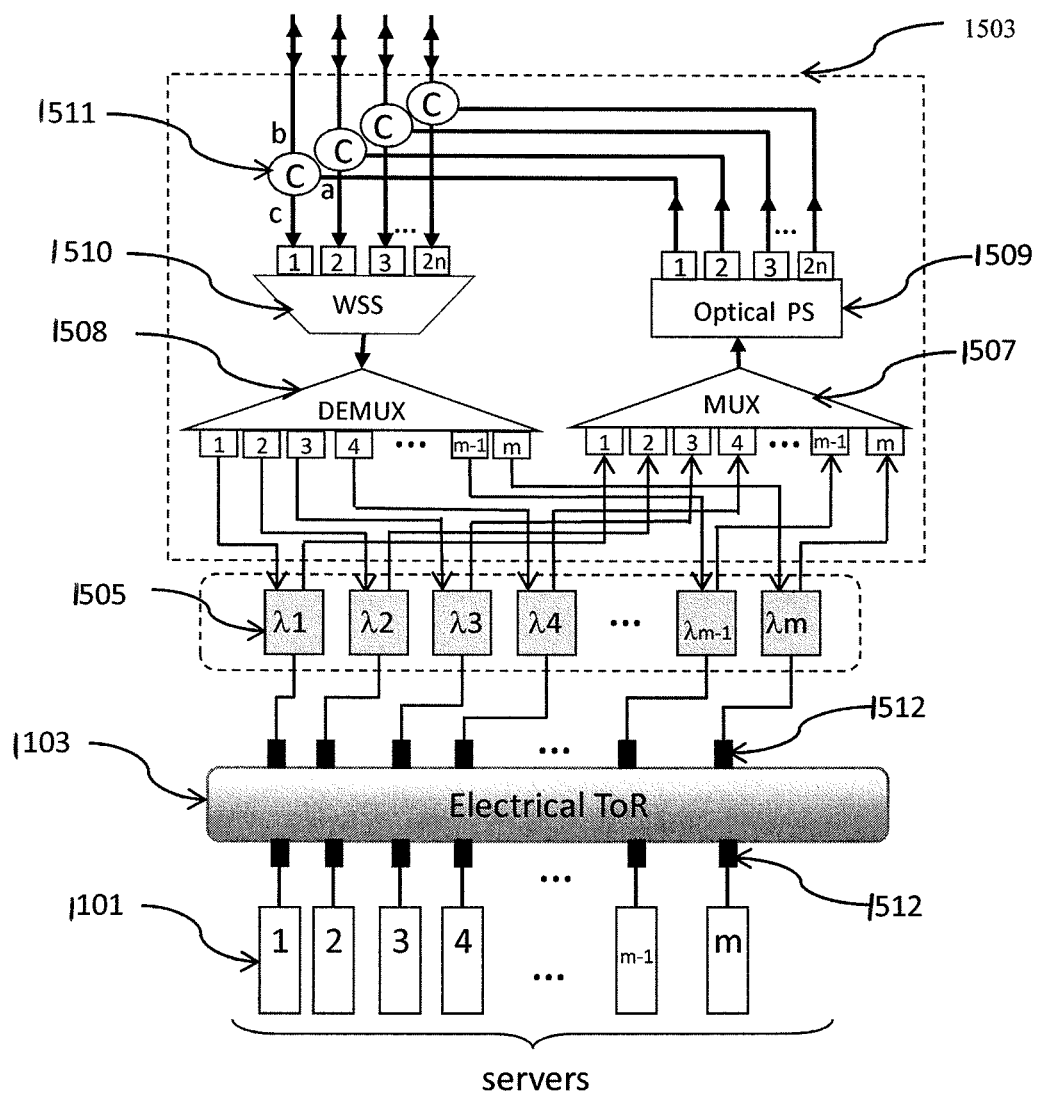
FIG. 13 is a wavelength selective switching unit architecture using a broadcast-and-select communication mechanism.
Figure 14:
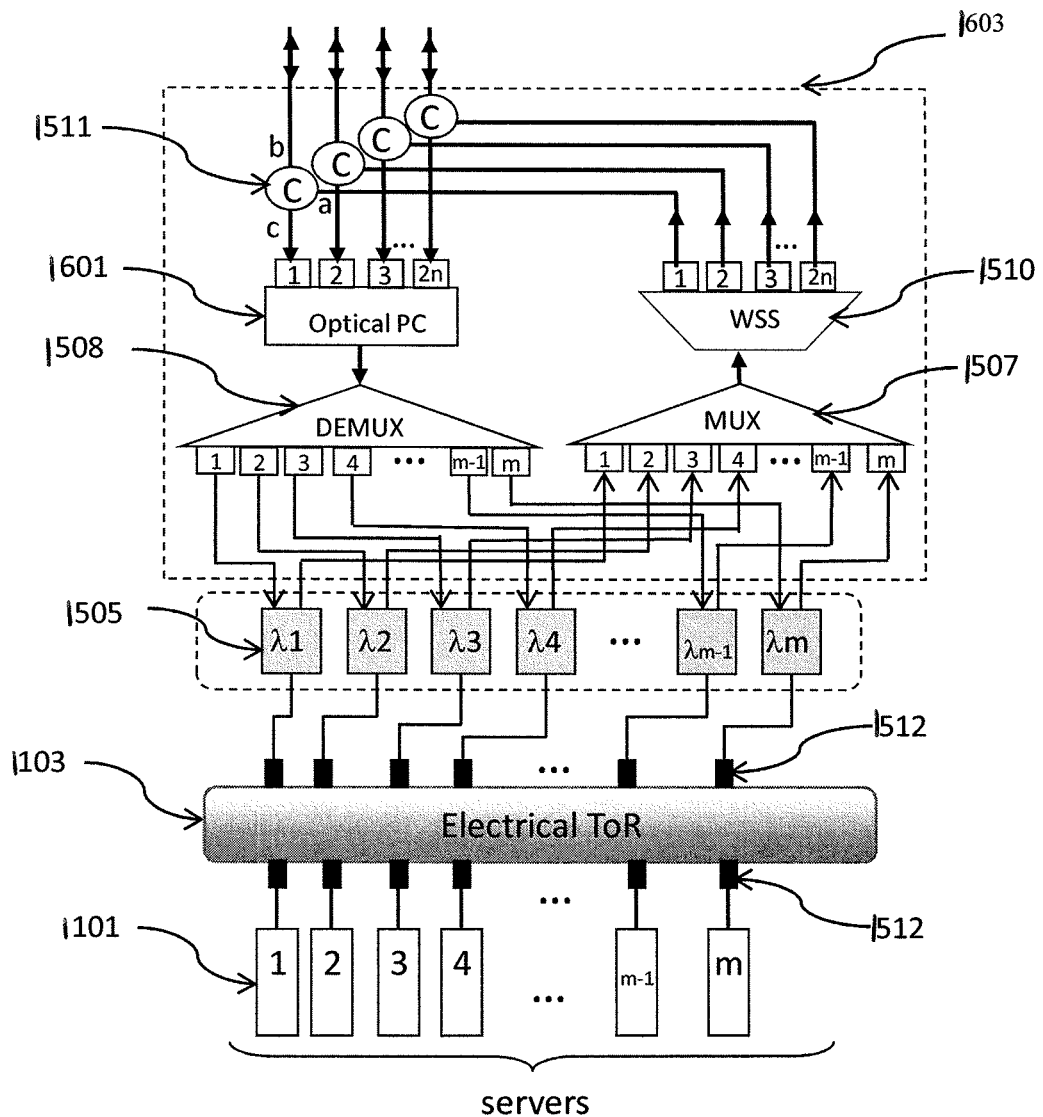
FIG. 14 is a wavelength selective switching unit architecture using the point-to-point communication mechanism according to the prior art.

A symmetric architecture of a broadcast-and-select based wavelength selective switching unit 1503 connected to ToR 1103 and servers 1101 is shown in FIG. 13. Each electrical ToR 1103 has 2m downstream ports. Downstream ports usually have lower line speed and are conventionally used to connect to the servers 1101. The higher-speed upstream ports are described with respect to the asymmetric architecture below.

In the symmetric wavelength selective switching unit 1503 of FIG. 13, half of the 2m downstream ports of electrical ToR 1103 are connected to rack servers 1101 and the other half are connected to m optical transceivers 1505 at different wavelengths, $\lambda_1, \lambda_2, \ldots \lambda_m$. In typical applications, the optical transceivers 1505 have small form-factors, such as the SFP (Small Form Factor Pluggable) type optical transceivers, at different wavelengths following typical wavelength division multiplexing (WDM) grids. Each optical transceiver 1505, typically consisting of a SFP type optical module sitting on a media converter (not shown), has one electrical signal connecting port 1512 (such as an electrical Ethernet port), one optical transmitting port and one optical receiving port. The bit rate of the optical transceivers 1505 at least matches or is higher than that of the Ethernet port 1512. For instance, if the Ethernet port 1512 supports 1 Gb/s signal transmission, the bit rate of each optical transceiver 1505 can be 1 Gb/s or 2.5 Gb/s; if the Ethernet port 1512 is 10 Gb/s, the bit rate of each optical transceiver 1505 is preferably 10 Gb/s as well. This configuration assures non-blocking communication between the servers 1101 residing in the same server rack 1102 and the servers 1101 residing in all other server racks 1102.

Logically above the ToR 1103 is a broadcast-and-select type design for the wavelength selective switching units 1503. The wavelength selective switching units 1503 are further interconnected via fixed and structured fiber links to support a larger number of server inter communications. Each wavelength selective switching unit 1503 includes an optical signal multiplexing unit (MUX) 1507, an optical signal demultiplexing unit (DEMUX) 1508 each with m ports, a 1×2n optical wavelength selective switch (WSS) 1510, a 1×2n optical power splitter (PS) 1509, and 2n optical circulators (c) 1511. The optical MUX 1507 combines the optical signals at different wavelengths for transmission in a single fiber. Typically, two types of optical MUX 1507 devices can be used. In a first type of optical MUX 1507, each of the input ports does not correspond to any specific wavelength, while in the second type of optical MUX 1507, each of the input ports corresponds to a specific wavelength. The optical DEMUX 1508 splits the multiple optical signals in different wavelengths in the same fiber into different output ports. Preferably, each of the output ports corresponds to a specific wavelength. The optical PS 509 splits the optical signals in a single fiber into multiple fibers. The output ports of the optical PS 1509 do not have optical wavelength selectivity. The WSS 1510 can be dynamically configured to decide the wavelength selectivity of each of the multiple input ports. As for the optical circulators 1511, the optical signals arriving via port "a" come out at port "b", and optical signals arriving via port "b" come out at port "c". The optical circulators 1511 are used to support bidirectional optical communications in a single fiber. However, in other embodiments, optical circulators 1511 are not required, and may be replaced with two fibers instead of a single fiber.

In the wavelength selective switching unit 1503 of FIG. 13, the optical transmitting port of the transceiver 1505 is connected to the input port of the optical MUX 1507. The optical MUX 1507 combines m optical signals from m optical transceivers 1505 into a single fiber, forming WDM optical signals. The output of optical MUX 507 is connected to the optical PS 1509. The optical PS 1509 splits the optical signals into 2n output ports. Each of the output ports of the optical PS 1509 has the same type of optical signals as the input to the optical PS 1509. Therefore, the m transmitting signals are broadcast to all of the output ports of the optical PS 1509. Each of the output ports of optical PS 1509 is connected to port "a" of an optical circulator 1511, and the transmitting signal passes port "a" and exits at port "b" of optical circulator 1511.

In the receiving part of the wavelength selective switching unit 1503, optical signals are received from other wavelength selective switching units 1503. The optical signals arrive at port "b" of optical circulators 1511, and leave at port "c". Port "c" of each optical circulator 1511 is coupled with one of the 2n ports of WSS 1510. Through dynamic configuration of the WSS 1510 with the algorithms described below, selected channels at different wavelengths from different server racks 1102 can pass the WSS 1510 and be further demultiplexed by the optical DEMUX 1508. Preferably, each of the output ports of optical DEMUX 1508 corresponds to a specific wavelength that is different from other ports. Each of the m output ports of the optical DEMUX 1508 is preferably connected with the receiving port of the optical transceiver 1505 at the corresponding wavelength.

Inter-rack communication is conducted using broadcast and select communication, wherein each of the outgoing fibers from the optical PS 1509 carries all the m wavelengths (i.e., all outgoing traffic of the rack). At the receiving end, the WSS 1510 decides what wavelengths of which port are to be admitted, and then forwards them to the output port of the WSS 1510, and the output of the WSS 1510 that is connected to the optical DEMUX 508. The optical DEMUX 1508 separates the WDM optical signals into the individual output port, which is connected to the receiving port of the optical transceivers 1505. Each ToR 1103 combined with one wavelength selective switching unit 1503 described above constitutes a node 1202 in FIGS. 10 and 11. All of the nodes 1202 are interconnected following a high-dimensional architecture 1404. All the wavelength selective switching units 1503 are further controlled by a centralized or distributed network manager 1402. The network manager 1402 continuously monitors the network situation of the data center 1100, determines bandwidth demand of each flow, and adaptively reconfigures the network to improve the network throughput and resolve hot spots. These functionalities are realized through a plurality of procedures, described in further detail below.

Asymmetric Architecture

The asymmetric architecture broadcast-select architecture achieves 100% switch port utilization, but at the expense of lower bisection bandwidth. The asymmetric architecture is therefore more suitable than the symmetric architecture for scenarios where server density is of major concern. In an asymmetric architecture, the inter-rack connection topology is the same as that of the symmetric counterpart. The key difference is that the number of the ports of a ToR 1103 that are connected to servers is greater than the number of the ports of the same ToR 1103 that are connected to the wavelength selective switching unit 1403. More specifically, each electrical ToR 1103 has m downstream ports, all of which are connected to servers 1101 in a server rack 102. Each ToR 1103 also has u upstream ports, which are equipped with u small form factor optical transceivers at different wavelength, $\lambda 1, \lambda 2, \ldots \lambda u$. In a typical 48-port GigE switch with four 10 GigE upstream ports, for instance, we have 2 m=48 and u=4.

Logically above the ToR 1103 is the wavelength selective switching unit 1503, which consists of a multiplexer 1507 and a demultipexer 1508, each with u ports, a 1×2n WSS, and a 1×2n power splitter (PS) 1509. The transmitting ports and receiving ports of the optical transceivers are connected to the corresponding port of optical multiplexer 1507 and demultiplexer 1508, respectively. The output of optical multiplexer 1507 is connected to the input of optical PS 1509, and the input of the optical demultiplexer 1508 is connected to the output of the WSS 1510. Each input port of the WSS 1510 is connected directly or through an optical circulator 1511 to an output port of PS of the wavelength selective switching unit 1403 in another rack 1102 via an optical fiber. Again, the optical circulator 1511 may be replaced by two fibers.

In practice, it is possible that the ports, which are originally dedicated for downstream communications connected with servers 1101, can be connected to the wavelength selective switching unit 1403, together with the upstream ports. In this case, the optical transceivers 1505 may carry a different bit rate depending on the link capacity of the ports they are connected to. Consequently, the corresponding control software will also need to consider the bit rate heterogeneity while provisioning network bandwidth, as discussed further below.

In both the symmetric and asymmetric architectures, a network manager 1402 optimizes network traffic flows using a plurality of procedures. These procedures will now be described in further detail.

Procedure 1: Estimating Network Demand.

The first procedure estimates the network bandwidth demand of each flow. Multiple options exist for performing this estimation. One option is to run on each server 1101 a software agent that monitors the sending rates of all flows originated from the local server 1101. Such information from all servers 1101 in a data center can be further aggregated and the server-to-server traffic demand can be inferred by the network manager 1402. A second option for estimating network demand is to mirror the network traffic at the ToRs 1103 using switched port analyzer (SPAN) ports. After collecting the traffic data, network traffic demand can be similarly inferred as in the first option. The third option is to estimate the network demand by emulating the additive increase and multiplicative decrease (AIMD) behavior of TCP and dynamically inferring the traffic demand without actually capturing the network packets. Based on the deployment scenario, a network administrator can choose the most efficient mechanism from these or other known options.

Procedure 2: Determining Routing.

Figure 15:
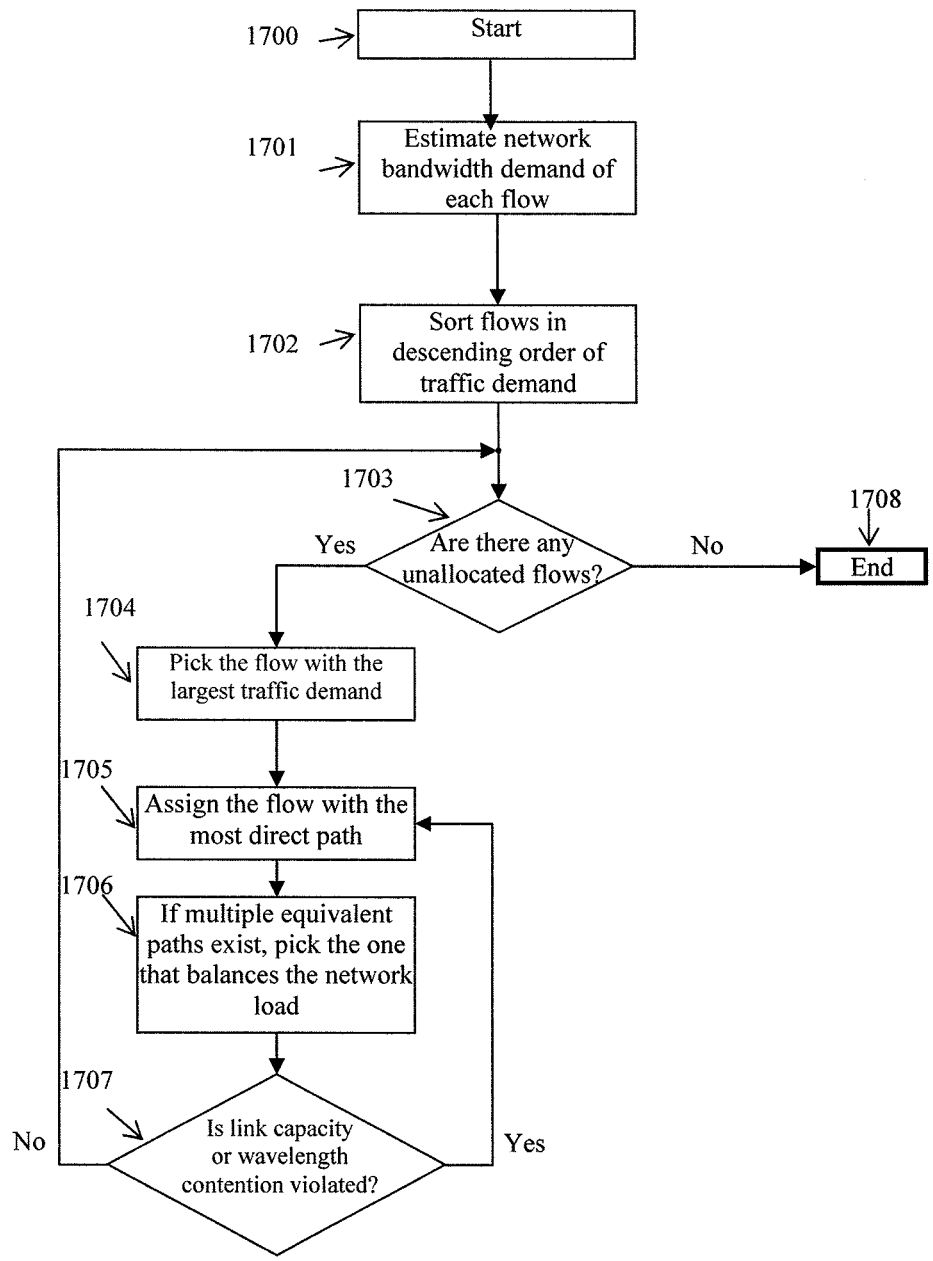
FIG. 15 is a flowchart of steps for determining routing of flows.

In the second procedure, routing is allocated in a greedy fashion based on the following steps, as shown in the flow chart of FIG. 15. The process begins at step 1700 and proceeds to step 1701, where the network manager 1402 identifies the source and destination of all flows, and estimates the network bandwidth demand of all flows. At step 1702, all flows are sorted in a descending order of the network bandwidth demand of each flow. At step 1703, it is checked whether all of the flows have been allocated a path. If all flows have been allocated a path, the procedure terminates in step 1708. Otherwise, the network manager 1402 identifies the flow with the highest bandwidth demand in step 1704 and allocates the most direct path to the flow in step 1705. If multiple equivalent direct paths of a given flow exist, in step 1706, the network manager chooses the path that balances the network load. The network manager 1402 then checks whether the capacities of all links in the selected path are exceeded in step 1707. Link capacity is preferably decided by the receivers, instead of the senders, which broadcast all the m wavelengths to all the 2n direct neighbors.

If the capacity of at least one of the links in the selected path is exceeded, the network manager goes back to step 1705 and picks the next most direct path and repeats steps 1706 and 1707. Otherwise, the network manager 402 goes to step 1704 to pick the flow with the second highest bandwidth demand and repeats steps 1705 through 1707.

In a physical network, each server rack 1102 is connected to another server rack 1102 by a single optical fiber. But logically, the link is directed. From the perspective of each server 1101, all the optical links connecting other optical switching modules in both the ingress and egress directions carry all the m wavelengths. But since these m wavelengths will be selected by the WSS 1510 at the receiving end, these links can logically be represented by the set of wavelengths to be admitted.

Figure 16:
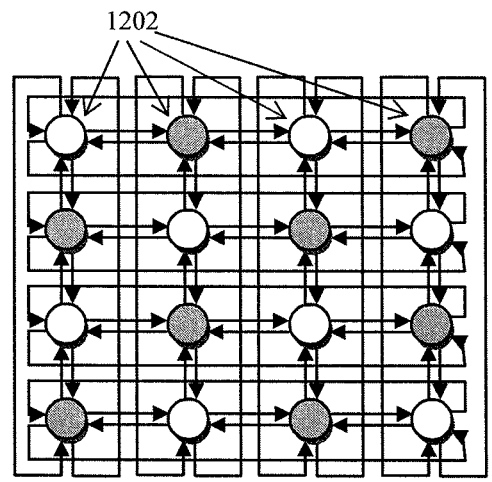
FIG. 16 is a logical graph of a 4-array 2-cube network using the wavelength selective switching unit of FIG. 13.

The logical graph of a 4-ary 2-cube cluster is illustrated in FIG. 16. Each directed link in the graph represents the unidirectional transmission of the optical signal. For ease of illustration, the nodes 1102 are indexed from 1 to k in each dimension. For instance, the i-th element in column j is denoted by (i,j). All nodes in $\{(i,j)|i=1, 3, \ldots, k-1, j=2, 4, \ldots, k\}$ and all nodes in $\{(i,j)|i=2, 4, \ldots, k, j=1, 3, \ldots, k-1\}$ are shown in WHITE, and all the remaining nodes are shaded. As long as k is even, such a perfect shading always exists.

Figure 17:
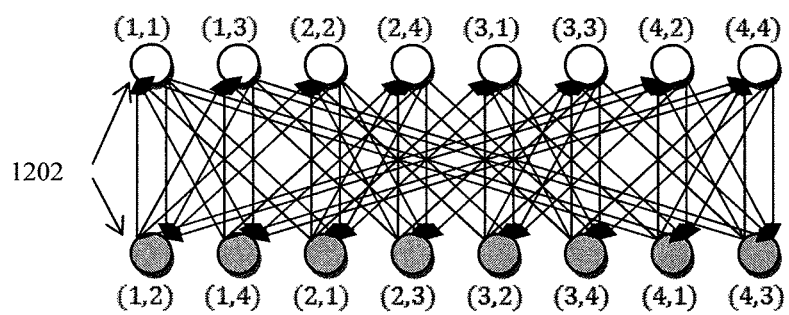
FIG. 17 is a bipartite graph representation of the logical graph of FIG. 16.

Next, all the WHITE nodes are placed on top, and all GREY nodes are placed on the bottom, and a bipartite graph is obtained, as shown in FIG. 17. In the graph of FIG. 17, all directed communications are between WHITE and GREY colored nodes, and no communications occur within nodes of the same color. This graph property forms the foundation of the key mechanisms of the present system, including routing and bandwidth provisioning.

Procedure 3: Provisioning Link Bandwidth and Assigning Wavelengths.

Figure 18:
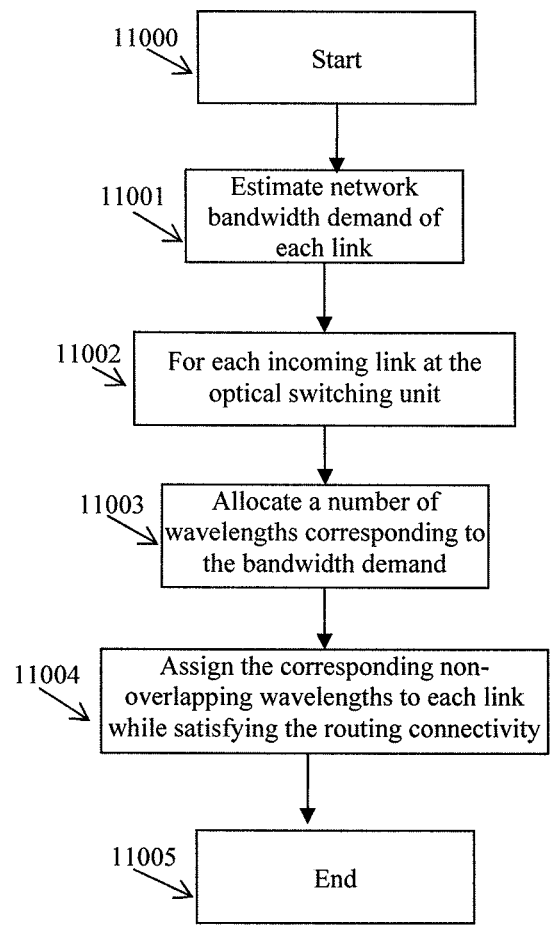
FIG. 18 is a flowchart of steps for provisioning bandwidth and assigning wavelengths on each link in the broadcast-and-select based system of FIG. 13.

In this procedure, the network manager 1402 provisions the network bandwidth based on the traffic demand obtained from Procedure 1 and/or Procedure 2, and then allocates wavelengths to be admitted at different receiving WSSs 1510, based on the following steps, as shown in the flowchart of FIG. 18. The process begins at step 11000, and proceeds to step 11001 where the network manager 1402 estimates the bandwidth demand of each optical link based on the bandwidth demand of each flow. In step 11002, the network manager 1402 determines for each link the number of wavelengths necessary to satisfy the bandwidth demand for that link. In step 11003, the network manager 1402 allocates a corresponding number of wavelengths to each link such that there is no overlap between the sets of wavelengths allocated to all the input optical links connected to the same wavelength selective switch 1510.

In step 11004, since at the WSS 1510, the same wavelength carried by multiple optical links cannot be admitted simultaneously (i.e., the wavelength contention problem), the network manager 1402 needs to ensure that for each receiving node, there is no overlap of wavelength assignment across the 2n input ports. Thereafter, the process ends at step 11005.

Procedure 4: Minimizing Wavelength Reassignment.

Figure 19:
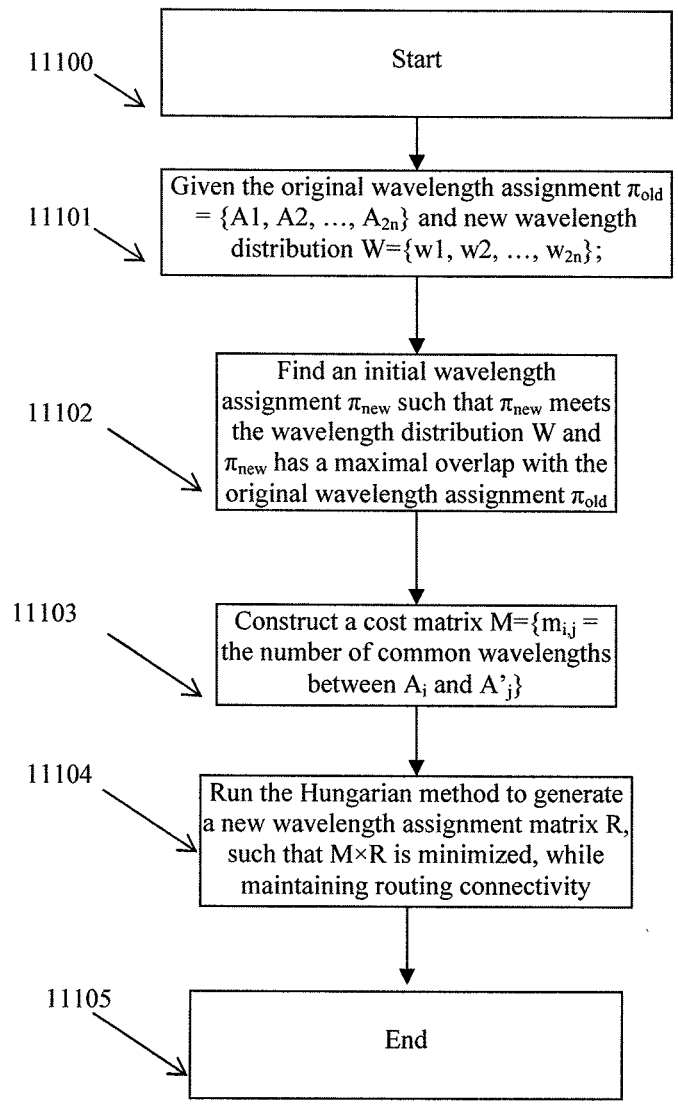
FIG. 19 is a flowchart of steps for minimizing wavelength reassignment in the broadcast-and-select based system of FIG. 13.
Figure 20:
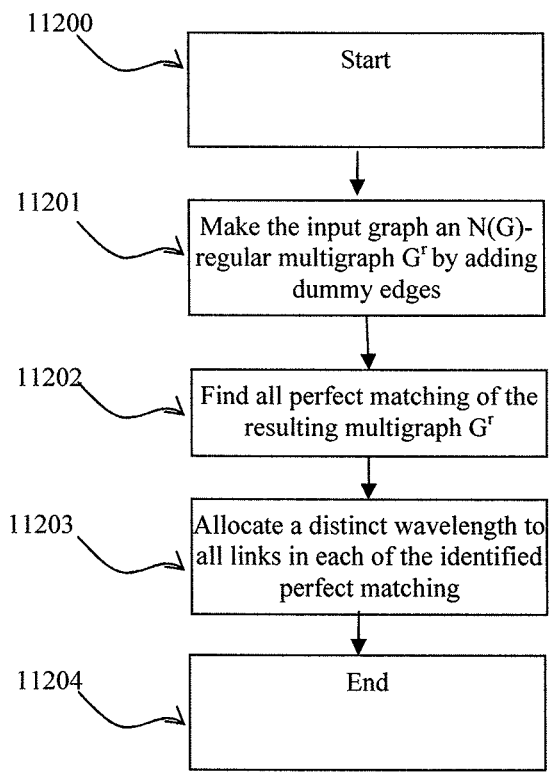
FIG. 20 is a flowchart of steps for provisioning bandwidth and assigning wavelengths on each link in the point-to-point based prior art system of FIG. 14.

Procedure 3 does not consider the impact of changes of wavelength assignment, which may disrupt network connectivity and lead to application performance degradation. Thus, in practice, it is desirable that only a minimum number of wavelength changes are performed to satisfy the bandwidth demands. Therefore, it is desirable to maximize the overlap between the old wavelength assignment old and the new assignment new. The classic Hungarian method can be adopted as a heuristic to achieve this goal. The Hungarian method is a combinatorial optimization algorithm to solve assignment problems in polynomial time. This procedure is described with reference to the flow chart of FIG. 19. The process begins at step 1100, and proceeds to step 11101, at which the network manager 1402 first identifies the old wavelength assignment $\pi_{old}=\{A1, A2, \ldots, A2n\}$ (where Ai denotes the set of wavelengths assigned to link i) and wavelength distribution (i.e., the number of wavelength required for each link) under the new traffic matrix. At step 11102, the network manager 1402 finds a new wavelength assignment $\pi_{new}=\{A'1, A'2, \ldots, A'2n\}$ that satisfies the wavelength distribution and has as much overlap with old as possible. In step 11103, the network manager 1402 constructs a cost matrix M, whose each element mij is equal to the number of common wavelengths between sets Ai and A'j. Finally, in step 1104, the network manager 1402 generates a new wavelength assignment matrix R (where $r_{ij} \in (0,1)$, $$\left(\text{where } r_{ij} \in (0, 1), \sum_i r_{ij} = 1, \text{ and } \sum_j r_{ij} = 1\right),$$

such that M×R is minimized, while maintaining routing connectivity. The process ends at step 1105.

Procedure 5: Recovering from Network Failures.

The fifth procedure achieves highly fault-tolerant routing. Given the n-dimensional architecture, there are 2n node-disjoint parallel paths between any two ToRs 1103. Upon detecting a failure event, the associated ToRs 1103 notifies the network manager 402 immediately, and the network manager 402 informs all the remaining ToRs 1103. Each ToR 1103 receiving the failure message can easily check which paths and corresponding destinations are affected, and detour the packets via the rest of the paths to the appropriate destinations. Applying this procedure allows the performance of the whole system to degrade very gracefully even in the presence of a large percentage of failed network nodes and/or links.

Procedure 6: Conducting Multicast, Anycast or Broadcast.

In the broadcast-and-select based design, each of the 2n egress links of a ToR 1103 carries all the m wavelengths. It is left up to the receiving WSS 1510 to decide what wavelengths to admit. Thus, multicast, anycast or broadcast can be efficiently realized by configuring the WSSs 1510 in a way that the same wavelength of the same ToR 1103 is simultaneously admitted by multiple ToRs 1103. The network manager 1402 needs to employ methods similar to the IP-based counterparts to maintain the group membership for the multicast, anycast or broadcast.

In the symmetric architecture described so far, the number of the ports of a ToR 1103 switch that are connected to servers equals the number of the ports of the same ToR 1103 that are connected to the wavelength selective switching unit 1403. This architecture achieves high bisection bandwidth between servers 1101 residing in the same server rack 1102 with the rest of the network at the expense of only 50% switch port utilization.

Point-to-Point Communication Mechanism

The architecture of the wavelength selective switching unit 1603 used for point-to-point communication is described in U.S. Patent Application Publication Nos. 2012/0008944 to Ankit Singla and 2012/0099863 to Lei Xu, the entire disclosures of both of which are incorporated by reference herein. In the present invention, these point-to-point based wavelength selective switching units 1603 are arranged into the high-dimensional interconnect architecture 1404 in a fixed structure. In the wavelength selective switching unit 1603, as illustrated with reference to FIG. 14, each electrical ToR 1103 has 2m ports, half of which are connected to rack servers 1101 and the other half are connected with m wavelength-division multiplexing small form-factor pluggable (WDM SFP) transceivers 1505.

Logically above the ToR 1103 are the wavelength selective switching units 1603, which are further interconnected to support a larger number of inter communications between servers 1101. Each wavelength selective switching unit 1603 includes optical MUX 1507 and DEMUX 1508 each with m ports, a 1×2n optical wavelength selective switch (WSS) 1510, a 1×2n optical power combiner (PC) 601, and 2n optical circulators 1511. In operation, the optical PC 601 combines optical signals from multiple fibers into a single fiber. The WSS 1510 can be dynamically configured to decide how to allocate the optical signals at different wavelengths in the single input port into one of the different output ports. The optical circulators 1511 are used to support bi-directional optical communications using a single fiber. Again, the optical circulators 1511 are not required, as two fibers can be used to achieve the same function.

Similar to the broadcast-and-select based system described earlier, all the wavelength selective switching units 1403 are interconnected using a high-dimensional architecture and are controlled by the network manager 1402. The network manager 1402 dynamically controls the optical switch fabric following the procedures below.

Procedures 1, 2, 5 and 6 are the same as the corresponding procedures discussed above with respect to the broadcast-and-select based system.

Procedure 3: Provisioning Link Bandwidth and Assigning Wavelengths on all Links

The third procedure of the point-to-point architecture is described with reference to FIG. 1100, wherein N(G) is the maximum node degree of a bipartite graph G. Each node of G represents a wavelength selective switching unit 1603. The procedure begins at step 11200, and proceeds to step 11201 where the network manager 1402 first constructs a N(G)-regular (i.e., each node in the graph G has exactly degree of N(G)) multi-graph (where multiple links connecting two nodes is allowed) by adding wavelength links, each representing a distinct wavelength, to each node of G. Next, in step 11202, the network manager 1402 identifies all sets of links such that within each set there are no two links sharing a common node and the links in the same set covers all nodes in the graph G. In step 11203, the network manager 1402 assigns a distinct wavelength to all links in the same set by configuring the wavelength selective switch 1510. The process then ends at step 11204.

Procedure 4: Minimizing Wavelength Reassignment.

This procedure is similar to Procedure 4 in the broadcast-and-select based system, finding a minimum set of wavelengths, while satisfying the bandwidth demands. This procedure first finds a new wavelength assignment new, which has a large wavelength overlap with the old assignment old. Then, uses new as the initial state and uses an adapted Hungarian method to fine-tune new to further increase the overlap between new and old.

In the present invention, all of the wavelength selective switching units 1603 are interconnected using a fixed specially designed high-dimensional architecture. Ideal scalability, intelligent network control, high routing flexibility, and excellent fault tolerance are all embedded and efficiently realized in the disclosed fixed high dimensional architecture.

Thus, network downtime and application performance degradation due to the long switching delay of an optical switching matrix are overcome in the present invention.

END OF APPENDIX

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A system for optimizing distributed application actions in an optical switching fabric, the optical switching fabric including a plurality of interconnected optical switching units, the system comprising:
   a network manager operably coupled to the optical switching fabric, the network manager configured to reconfigure the interconnected optical switching units; and
   a management platform configured to:
      receive actions from one or more distributed applications, the actions associated with the optical switching fabric;
      translate the received actions into one or more network operation primitives;
      process the network operation primitives to determine an optimized set of network operation primitives to be actuated on the optical switching fabric;
      determine an optimal execution sequence for the optimized set of network operation primitives; and
      execute the optimized set of network operation primitives based on the optimal execution sequence on the optical switching fabric.

* * * * *